Dec. 25, 1956 J. KOLLMAN ET AL 2,775,383
FOOD PACKAGING ASSEMBLY
Filed June 18, 1952
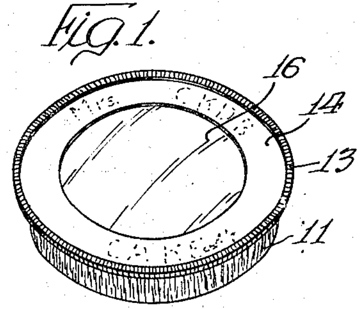
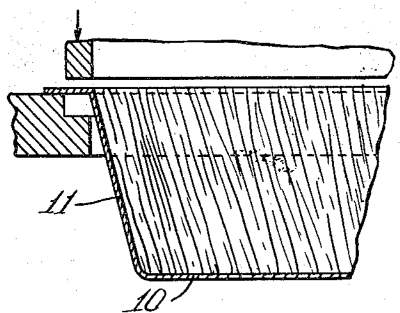
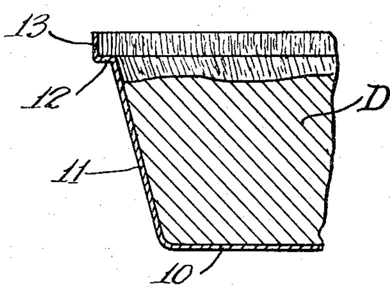
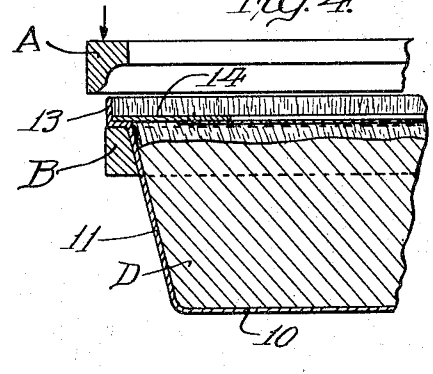
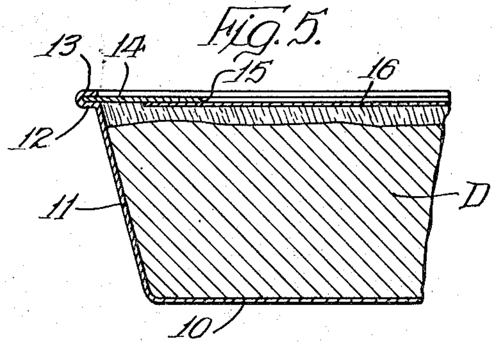
INVENTORS.
Jack Kollman
William A. Beck
BY [signature]
Atty.

United States Patent Office 2,775,383

Patented Dec. 25, 1956

1

2,775,383

FOOD PACKAGING ASSEMBLY

Jack Kollman, Chicago, and William A. Beck, Itasca, Ill., assignors, by mesne assignments, to Ekco-Alcoa Containers, Inc., River Grove, Ill., a corporation of Illinois Application June 18, 1952, Serial No. 294,242

2 Claims. (Cl. 229—3.5)

The present invention relates to a food packaging unit and more particularly such a unit adapted for use in the production and sale of baked goods such as pies, cakes and the like.

An object of this invention is to provide a food packaging unit employing a container of thin readily deformable material, such for example as thin aluminum or other metallic foil which affords a utensil in which the contents may be baked and also a protective package in which the baked contents may be delivered and stored for ultimate consumption of the contents.

A further object of this invention is to produce a food packaging unit of the character described which may be produced and used at a minimum of expense and yet assure the highest degree of sanitation and attractiveness desired in the merchandising of food articles.

Further objects will be apparent from the detailed description taken in connection with the accompanying drawing, in which—

Fig. 1 is a top perspective view of a food packaging unit in accordance with this invention.

Figs. 2, 3 and 4 are enlarged vertical sectional fragmentary views showing the development and design of the container in preparation for assembly with the cover.

Fig. 5 is an enlarged vertical sectional view showing the relative position of parts when the food packaging unit is in a completed state.

The container illustrated in the drawings comprises a body of thin metallic foil material having a thickness in the range of .003 inch to .005 inch, said body being shaped to provide a bottom wall 10 and a side wall 11 surrounding and extending upwardly from the perimeter of the bottom. The side wall 11 preferably slants upwardly and outwardly from said bottom wall 10 to facilitate nesting of a multiple of such containers in stacked relation pending actual use of the container.

The side wall 11 is offset laterally outwardly to provide an internal upwardly facing seat 12. The remnant portion of the side wall to which the seat 12 is joined at the outer perimeter of the latter is designated by the number 13.

The container as thus described provides an open top utensil in which an article of dough D may be supported and confined while the dough is subjected to baking temperature incident to preparation of the contents into a final state ready for consumption, such as a baked pie or cake. While the container is shown as circular it can be elliptical or rectangular, as desired.

The baked article, so confined in the container as described, is further protected by a cover 14 of frangible material such as cardboard, or the like. The cover 14 is of such shape as to fit within the remnant wall portion 13 at the mouth of the container for downward engagement with the seat 12 and of such thickness as to be substantially overtopped by the portion 13. When the cover 14 is thus supported on the seat 12, the remnant wall portion 13 is bent and curled inwardly in overlapping relation to the upwardly facing edge portion of the cover as shown in Fig. 4 between suitable devices A and B so as to retain the cover against accidental removal from said seat 12. The contents are consequently completely enclosed and yet easily accessible by uncurling or bending up the inwardly bent wall portion 13 and lifting the cover from said seat. Obviously also, the cover may be easily replaced and the marginal rim bent down again by finger manipulation so that partially used contents may be kept reasonably fresh.

The metallic foil of which the container is made may be of any desired character. In a container for baking cakes and the like, highly polished metal foil, such as aluminum foil, is preferred because of its quality in producing a quick and easy bake of the goods baked therein as well as providing a surface from which the baked goods are readily released without special treatment of such surface.

As shown in Figs. 4 and 5, the cover 14 may be suitably provided with a transparent central portion by forming an opening 15 in the body of the cover and applying a sheet 16 of cellophane or the like across the edges of the opening 15, whereby the contents of the covered container may be readily visible without removal of the cover.

It is obvious that various changes may be made in details without departing from the spirit of this invention and it is, therefore, to be understood that this invention is not to be limited to the specific details shown and described.

What is claimed is:

1. In a food packaging unit, a semi-rigid nestable pan-like container formed from a sheet of metallic foil that is stiff enough to hold its shape but pliable enough so that it is readily bendable along its edge portions by finger manipulation, said container having a bottom wall and an outwardly flaring side wall surrounding and extending upwardly from said bottom wall, said side wall being bent outwardly at its upper edge to define an upwardly facing peripheral seat extending about the margin of the container, said sheet at the outer edge of said seat being bent upwardly to provide an upstanding rim to define the outer edge of said seat, a cover member having a relatively rigid marginal portion shaped to conform to the shape of the seat and resting thereon, said sheet also having a remnant marginal portion about the rim bent inwardly to a retaining position over the border of said cover to secure the cover in position on said seat and to close and stiffen the container, said remnant marginal portion being readily bendable by finger manipulation to or toward an upstanding position to release such cover.

2. A baking utensil as set forth in claim 1 in which the sheet is of aluminum foil having a thickness of about .003 to .005 inch.

References Cited in the file of this patent

UNITED STATES PATENTS

| | | |
|---|---|---|
| 1,689,018 | Froidevaux | Oct. 23, 1928 |
| 2,119,148 | Bastas | May 31, 1938 |
| 2,126,185 | Friedl | Aug. 9, 1938 |
| 2,174,425 | Schlumbohm | Sept. 26, 1939 |
| 2,181,150 | Pittenger | Nov. 28, 1939 |
| 2,226,155 | Bjornson | Dec. 24, 1940 |
| 2,533,554 | Byerly | Dec. 12, 1950 |
| 2,550,815 | Inwood | May 1, 1951 |
| 2,673,806 | Colman | Mar. 30, 1954 |

FOREIGN PATENTS

| | | |
|---|---|---|
| 8,163 | Great Britain | of 1901 |
| 103,316 | Australia | June 20, 1936 |